United States Patent [19]
Shimada et al.

[11] Patent Number: 5,790,845
[45] Date of Patent: Aug. 4, 1998

[54] SYSTEM WITH RESERVATION INSTRUCTION EXECUTION TO STORE BRANCH TARGET ADDRESS FOR USE UPON REACHING THE BRANCH POINT

[75] Inventors: Kentaro Shimada, Kokubunji; Makoto Hanawa, Niiza; Kazumichi Yamamoto, Hachiouji; Kenji Kaneko, Sagamihara, all of Japan

[73] Assignee: Hitachi, Ltd., Tokyo, Japan

[21] Appl. No.: 607,259

[22] Filed: Feb. 21, 1996

[30] Foreign Application Priority Data

Feb. 24, 1995 [JP] Japan .................. 7-062198

[51] Int. Cl.$^6$ .................................... G06F 9/38
[52] U.S. Cl. .................. 395/585; 395/706; 395/708; 395/383; 395/584
[58] Field of Search ................... 395/706, 383, 395/584, 585, 586, 708

[56] References Cited

U.S. PATENT DOCUMENTS

| | | | |
|---|---|---|---|
| 5,142,634 | 8/1992 | Fite et al. | 395/587 |
| 5,237,666 | 8/1993 | Suzuki et al. | 395/587 |
| 5,530,825 | 6/1996 | Black et al. | 395/421.03 |
| 5,592,634 | 1/1997 | Circello et al. | 395/586 |
| 5,606,676 | 2/1997 | Grochowski et al. | 395/586 |
| 5,615,386 | 3/1997 | Amerson et al. | 395/585 |

FOREIGN PATENT DOCUMENTS 63-316131 12/1988 Japan .
1-222329 9/1989 Japan .
5-224925 9/1993 Japan .
6-59889 3/1994 Japan .
6-332698 12/1994 Japan .

OTHER PUBLICATIONS

Computer Architecture: A Quantitative Approach, 1990, J.L. Hennessy et al Morgan Kaufmann Publishers, chapter 6.

Primary Examiner—Kenneth S. Kim
Attorney, Agent, or Firm—Fay, Sharpe, Beall, Fagan, Minnich & McKee

[57] ABSTRACT

To improve the efficiency of instruction branch operations, particularly in a pipeline processor, a branch reservation instruction is generated during program compile. The system includes a processor having a branch address stack 10 for storing pairs of branch point addresses and branch target addresses, a program counter (PC) 12 which holds a current instruction fetch address, a comparator 11 which compares the branch point address of the most recently entered pair stored in the stack 10 and the value of the PC 12, and a selector 14 which, when the result of comparison shows the coincidence, switches the instruction fetch address from the value of the PC 12 to the branch target address of the most recently entered pair stored in the stack 10. The branch operation is performed by reserving a pair of a branch target address and a branch point address in the stack 10 by a branch reservation instruction in advance of the branch point in the instruction sequence, and switching the next instruction fetch address to the branch target address promptly when the instruction fetch reaches the branch point.

15 Claims, 11 Drawing Sheets

| EXAMPLE | MNEMONIC | OPERANDS |
|---|---|---|
| (a) | BRANCH TARGET | FROM ADDR, TO ADDR |
| (b) | BRANCH ON REGISTER | FROM ADDR, REG |
| (c) | POP TARGET | CONDITION |
| (d) | COMPARE AND POP | %a, %b, CONDITION |

FIG. 5A

```
if (a==b)
    ... (then clause)

else
    ... (else clause)
```

FIG. 5B

```
        compare        %a, %b
        branch         not equal, L1
L0:
        ... (then clause)
        branch         L2
L1:
        ... (else clause)
L2:
        ...
```

FIG. 5C

```
        branch target      L0, L1
        compare and pop    %a, %b, equal
L0:
        branch target      L1, L2
        ... (then clause)
L1:
        ... (else clause)
L2:
        ...
```

FIG. 6
| CALLER | SUBROUTINE |
|---|---|
| branch target L1, L2 ... mov L1, %r1 L1: ... | L2: branch on register L3, %r1 ... L3: |
FIG. 7A
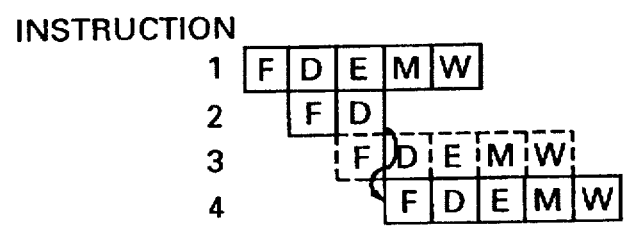
FIG. 7B
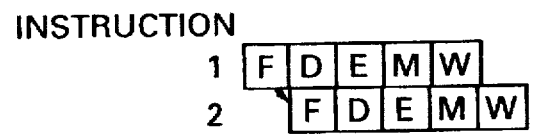

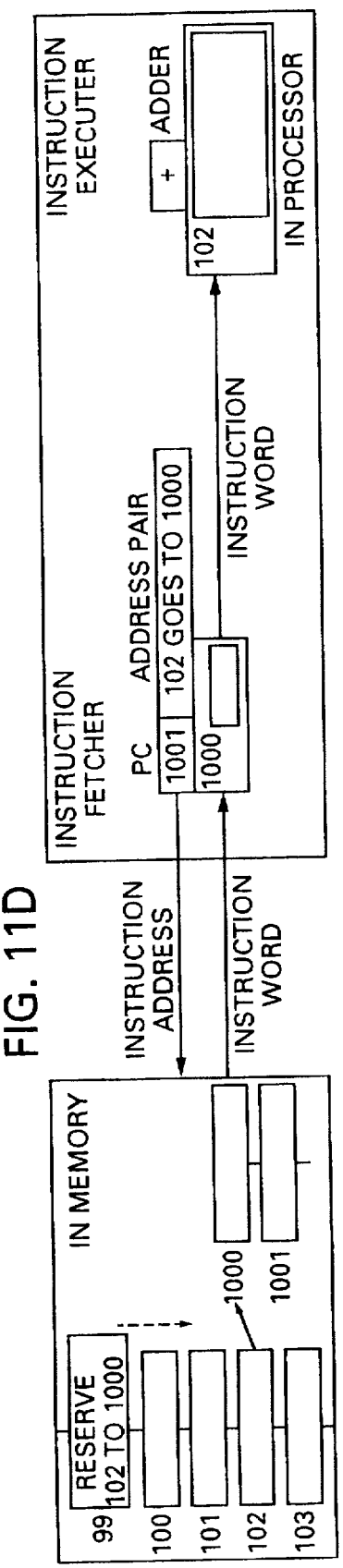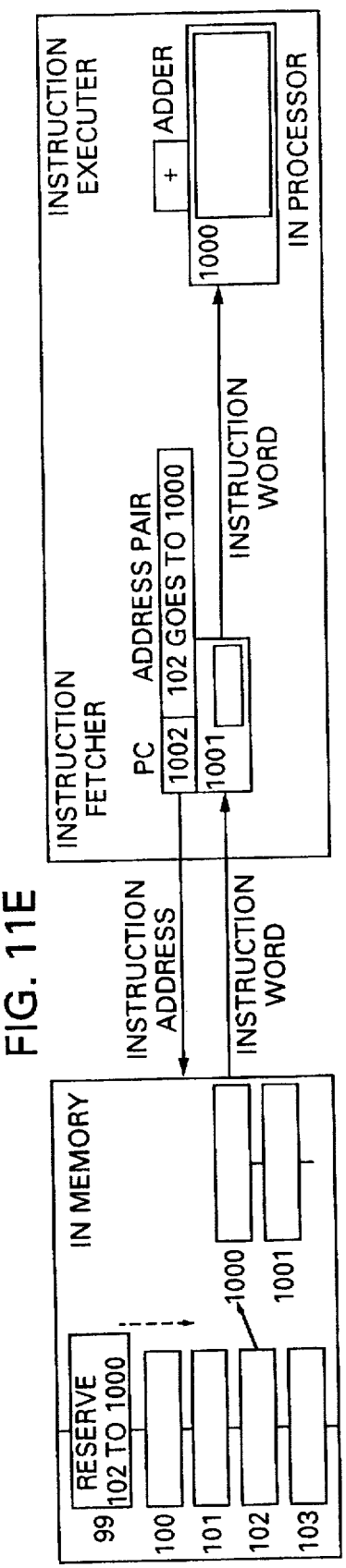
FIG. 11D
FIG. 11E

SYSTEM WITH RESERVATION INSTRUCTION EXECUTION TO STORE BRANCH TARGET ADDRESS FOR USE UPON REACHING THE BRANCH POINT

BACKGROUND OF THE INVENTION

The present invention relates to an instruction branching for a processor in which instruction fetch and instruction execution are carried out in parallel in a pipeline processing.

The branch operation in conventional pipeline processors to be described below is detailed in "Computer Architecture: A Quantitative Approach", David A. Patterson and John L. Hennessy, Morgan Kaufmann Publishers, Inc., 1990, in particular, in chapter 6.

In a general pipeline processor, execution of instruction and fetch of a subsequent instruction are performed in parallel in order to speed up the overall operation. However, when a branch instruction is executed and then a branch takes place, since the simultaneously fetched instruction subsequent to the branch instruction is not executed, the fetch of the subsequent instruction is of no use. Further, since a branch target instruction is determined only after the execution of the branch instruction and based on the result of such execution, it takes time until a branch target instruction is fetched. In a conventional pipeline processor, the impossibility of performing in parallel a useful subsequent instruction fetch and a branch instruction has been a major factor in causing processor performance problems.

Therefore, conventionally, by executing one instruction subsequent to the branch instruction, effective utilization of the subsequent instruction fetch is made. This is called delayed branching since the branch operation is executed apparently after executing the instruction subsequent to the branch instruction. By improving the logic design of the processor, it is possible to calculate a branch target address during the subsequent instruction fetch. Thereby, it becomes possible to carry out a branch target instruction fetch immediately after executing the subsequent instruction. An efficient branch operation has been done even in a pipeline processor through such an arrangement. However, there are the following problems.

In an operating system that performs process management, there is a branch instruction which calculates the branch target address dynamically using values in registers or the like. However, when such a complicated branch target address calculation is conducted, there arises a problem that the calculation may not be completed within a limited time during which a single subsequent instruction is fetched in parallel.

It is a prerequisite that the subsequent instruction can be executed whether the branch is taken or not. Finding such instructions is not always possible in some programs, particular when the branch instruction thereof is a conditional branch instruction.

There has been increasing use of parallel execution in units of one instruction called a super-scalar processor or a VLIW (Very Long Instruction Word) processor, in which instruction execution pipelines are provided in a processor and instructions are simultaneously fetched and parallelly executed. Since a branch instruction and the instruction subsequent thereto are often fetched simultaneously, it is impossible to hide the execution time of the branch instruction with the fetch time of the subsequent instruction as in the delayed branch method. As a result, a period of time from fetching (plural instructions included) a branch instruction until fetching a branch target instruction to be executed subsequently is markedly long, thereby causing a significant problem.

A conventional solution to such problems has been a branch prediction. There are two types of branch prediction, a static branch prediction and a dynamic branch prediction. According to the static branch prediction, whether or not a branch will occur is predicted based on static information about the type of the branch instruction and about whether the branch target is forward or backward, and so forth. According to the dynamic branch prediction, a history is recorded to some extent as to whether or not a branch was made in the past by the branch instruction, and on the basis of the history it is predicted through a predetermined algorithm whether or not a branch will occur.

An instruction fetch section within the processor detects whether or not there exists any branch instruction in fetched instructions. When there exists any branch instruction, it is determined in accordance with the branch prediction whether the instruction to be fetched next is the subsequent instruction or the branch target instruction. The detection of the branch instruction by the instruction fetch section should be fast enough to be completed before another instruction fetch occurs immediately thereafter.

The conventional branch prediction is provided with a table using a content addressable memory (CAM) storing the address of a branch instruction in pair with the corresponding branch target address, and thereby retrieval on content or part of content can be made. Namely, in the first execution of each branch instruction, the address where the branch instruction is placed is recorded together with the branch target address obtained as a result of the execution, and every time a new instruction is fetched, the table is searched to see if the address thereof is already recorded. Thus, each branch instruction can be detected more quickly for the next time and later times, and the corresponding branch target address can be obtained as well. Further, if the table stores history information regarding the past branching occurrence of the branch instruction, as well as the address where the branch instruction is stored and its corresponding branch target address in combination, branch prediction becomes possible at the same time.

The efficiency of the branch operation for the pipeline processor has been improved by branch prediction as described above. However, since it is only after the first execution of the branch instruction that the address indicative of the location of the branch instruction and its corresponding branch target address are registered in the table, branching cannot be predicted before the first execution of branching. Further, since such a table is limited in size and there may exist a plurality of branch instructions, some of them must be replaced according to a predetermined algorithm such as an LRU (Least Recently Used) algorithm. Accordingly, branch instructions that have been removed from the table as a result of replacement become unable to be predicted using branch prediction until the branching is executed again.

There is a greater problem of the accuracy of the branch prediction. Since the branch prediction simply predicts a branching before actual execution of the branch instruction, the prediction may prove wrong. Such accuracy of prediction may depend on the branch prediction algorithm as well as on the characteristics of the program to be executed. For programs which include a conditional branch instruction such that the condition changes in every execution, it is very difficult to improve the accuracy.

When a prediction has proved wrong, all of the instructions fetched according to the prediction must be cleared, and the instruction fetch must be restarted from the branch point. Consequently, branch prediction sometimes takes longer than would be expected without such prediction.

SUMMARY OF THE INVENTION

The present invention solves the above problems by noticing the importance of the fact that a branch target can be mostly determined sufficiently in advance of its branch point at which a branch occurs in an instruction sequence, statically during the compiling of the program, or even dynamically before a return from a subroutine.

The present invention can perform an efficient branch operation even when an instruction fetch and an instruction execution are being conducted in parallel in a pipeline processor by a branch reservation instruction generated during the program compile.

A processor executes a branch reservation instruction to reserve in memory the address of the branch point and the address of the branch target which are both designated by the branch reservation instruction; judges by comparison whether or not the address from which an instruction is fetched has reached the address of the reserved branch point; and switches the address from which the next instruction is to be fetched to the address of the reserved branch target, when the address from which the instruction is fetched is judged to have reached the address of the branch point.

When plural branch reservation instructions are executed sequentially, a plurality of branches are reserved by repeating the step of reserving, and the comparison is with respect to the address of the branch point most recently reserved.

Conditionally canceling a branch reservation of the addresses of a branch point and its branch target before the address of the branch point is reached, is performed by executing a conditonal cancel instruction. In response to a cancel signal from the instruction executing section, the pair of branch point and branch target addresses designated by the cancel signal is canceled.

A program counter holds the address from which an instruction is fetched (or an increment thereof) for comparing the value held with the branch point address taken out of the stored branch address pair. The value held in the program counter is changed to the value of the branch target address when the result of comparison shows coincidence. Plural pairs of branch target addresses and branch point addresses are stored preferably. The comparing selects the most recently entered pair from the plural pairs of the branch addresses and compares the value of the branch point address of the selected pair with the value held in the program counter.

Since the branch target address is determined before reaching the branch point in execution, the branch reservation instruction can be inserted sufficiently before the branch point to prevent delay, and the branch instruction can be eliminated from the branch point.

BRIEF DESCRIPTION OF THE DRAWINGS

Further objects, features and advantages of the present invention will become more clear from the following detailed description of a preferred embodiment, shown in the accompanying drawing, wherein:

FIG. 5A is a diagram of conditional branch processing written in C language;

FIG. 5B is a diagram of the conditional branch processing shown in FIG. 5A showing a sequence of instructions for a conventional processor;

FIG. 5C is a diagram of the conditional branch processing shown in FIG. 5A showing a sequence of instructions performed according to the present invention;

FIG. 6 is a diagram of an example of a subroutine call and subroutine return using a branch reservation instruction;

FIG. 7A is a diagram showing a pipeline operation of a conventional branch instruction;

FIG. 7B is a diagram showing a pipeline operation of a branch reservation instruction performed according to the present invention;

FIGS. 11A, 11B, 11C, 11D, and 11E are sequential diagrams showing the execution of a program in which a branch reservation instruction has been inserted according to the present invention.

DETAILED DESCRIPTION

Figure 1:
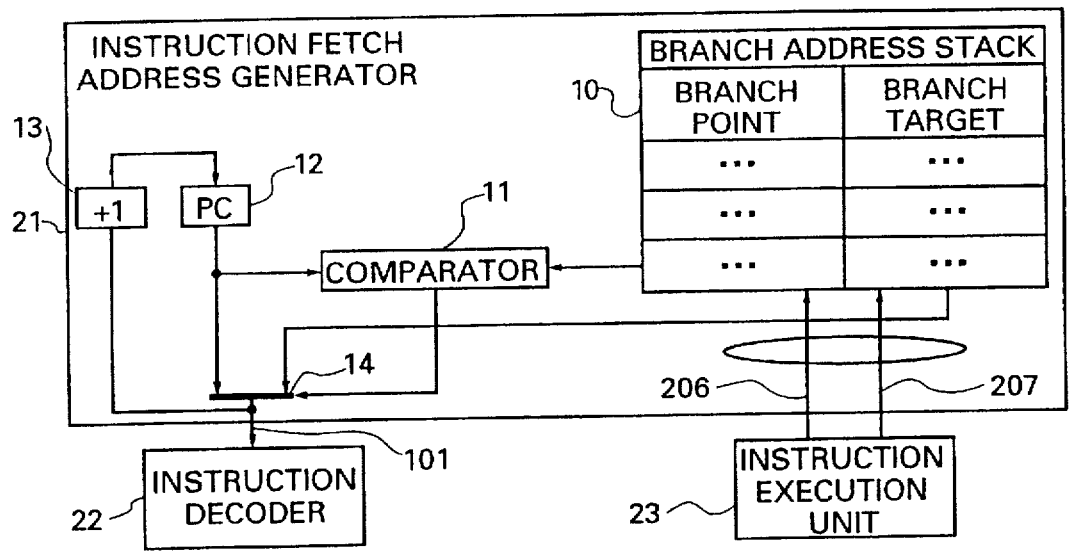
FIG. 1 is a diagram of a first embodiment of an instruction fetch address generator of a processor according to the invention.

In the instruction fetch address generator 21 of FIG. 1, as a result of execution of a branch reservation instruction in the instruction execution section 23, a branch point address 206 and a branch target address 207 are registered in a branch address stack 10.

The branch reservation instruction is produced in advance at the time of program compile and placed in the instruction sequence sufficiently prior to the branch point. In most cases, the branch target address for a branch at a particular branch point can be determined sufficiently before the branch point is reached at which a branching is performed in the instruction sequences, statically during the program compile or dynamically upon the return from a subroutine as in FIG. 6.

Normally, an instruction fetch address is output by a selector 14 from a program counter (PC) 12 through a fetch address bus 101. With every instruction fetch, the next instruction fetch address is calculated in an incrementor (+1) (an adder) 13, which is written back into the program counter 12.

The output of the program counter 12 also is input to a comparator 11 to check whether or not the output coincides with a branch point address registered in the branch address stack 10. In the branch address stack 10 a plurality of pairs of branch point addresses and branch target addresses are registered, and the most recently entered branch point address is input to the comparator 11. When coincidence is detected in the comparator 11, the branch target address of the most recently entered pair registered in the branch address stack 10 is read out from the branch address stack 10 and output by the selector 14 to the fetch address bus 101 to an instruction decoder 22. When a branch target address is read out from the branch address stack 10, the corresponding pair of the branch target address and the branch point address is erased from the branch address stack 10, then another pair stored in a row immediately above the erased pair becomes the most recently entered pair. The branch target address is incremented and rewritten in the program counter 12 through the incrementor 13, to continue the sequential fetch of instructions after the branch target address.

Figure 2:
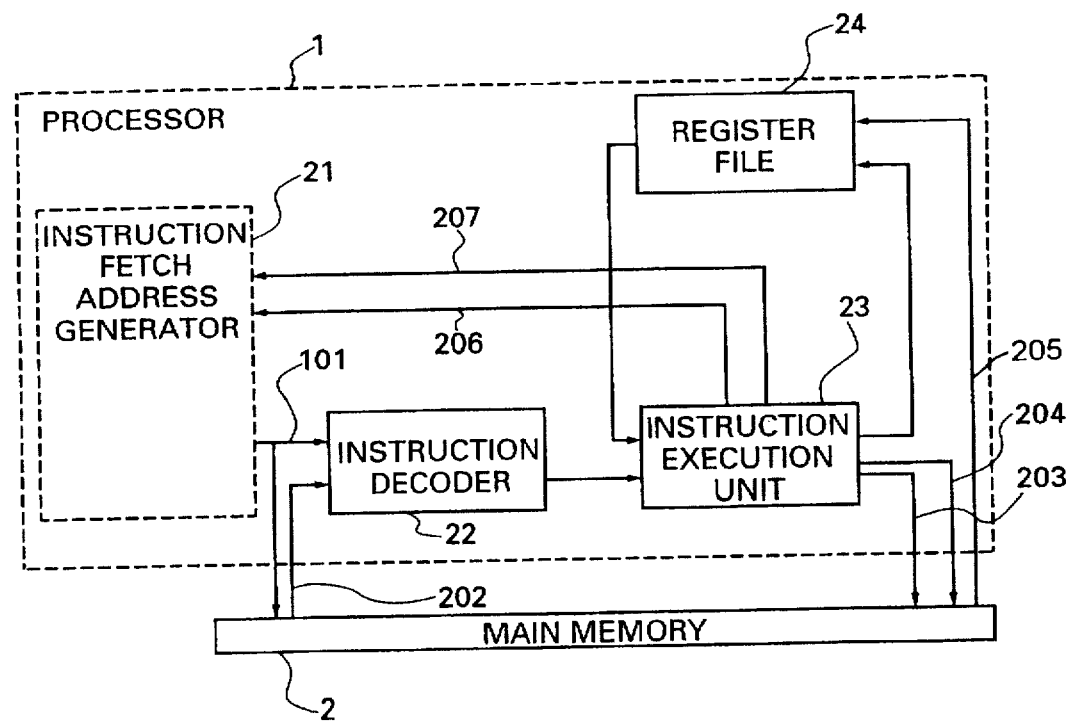
FIG. 2 is an example of an overall configuration of the processor.

FIG. 2 shows a processor 1 that is provided with the instruction fetch address generator 21 of FIG. 1. The instruction decoder 22 decodes a fetched instruction. The instruction execution unit 23 executes instructions in accordance with the result of decoding, and a register file 24 stores data within the processor 1. The main memory 2, which may be an external storage device, is connected to the processor 1 via the fetch address bus 101, a fetch instruction bus 202, a data address bus 203, a write data bus 204, and a read-out data bus 205. The main memory 2, in accordance with the instruction fetch address output to the fetch address bus 101, returns the stored instruction at that address to the fetch instruction bus 202. At the data address that was output to the data address bus 203, the main memory 2 stores data output to the write data bus 204 for a WRITE or outputs data previously stored to the read-out data bus 205 as a READ. The main memory 2 may include a cache memory.

An instruction read out from the main memory 2 onto the fetch instruction bus 202 is sent to the instruction decoder 22 together with the instruction address via the fetch address bus 101. The instruction decoder 22 decodes the instruction, sends the result of decoding to the instruction execution unit 23, and reads out necessary data from the register file 24 to send the read data to the instruction execution unit 23.

The instruction execution unit 23 executes the instruction using the instruction decoding result and the data of register file 24, writes the result of execution in the register file 24, and conducts read/write of data into and from the main memory 2. In the case of a branch reservation instruction, the instruction execution section 23 outputs the values of the branch point address and the branch target address (determined as the result of the instruction execution) through the branch point address bus 206 and branch target address bus 207 to the instruction fetch address generator 21 to be stored in the branch address stack 10 as a pair.

In FIG. 2, the instruction fetch address generator 21, the instruction decoder 22 and the instruction execution unit 23 are all operated in parallel. Namely, thereby, the processing of instructions is pipelined.

Figures 3, 4:
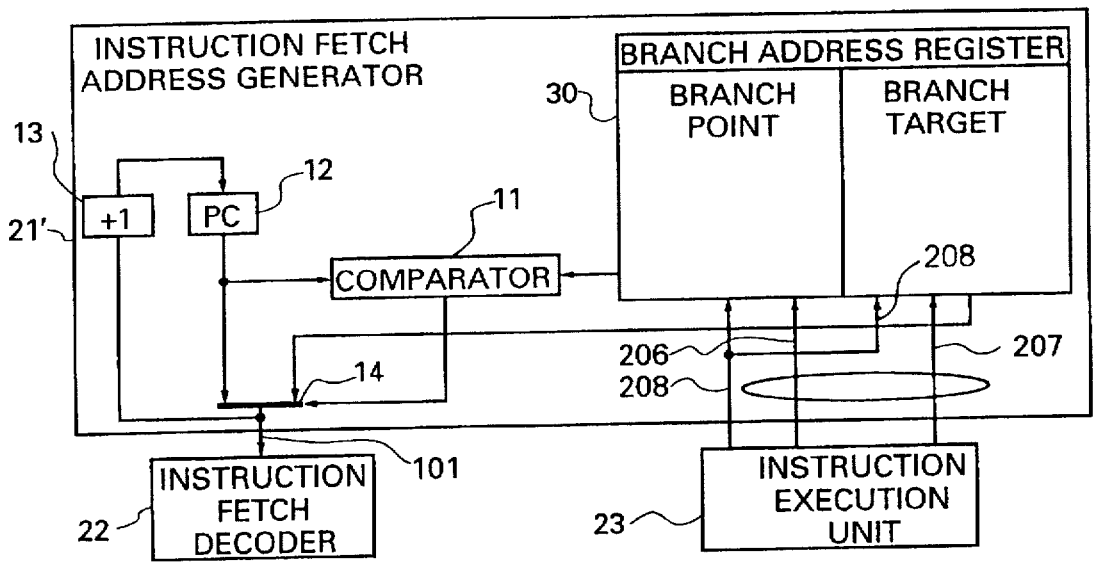
FIG. 3 is a diagram of a second embodiment of the instruction fetch address generator.
FIG. 4 is a diagram showing examples of a branch reservation instruction and of a branch reservation cancel instruction.

FIG. 3 shows another embodiment of the instruction fetch address generator 21'. The values of only one pair of a branch point address and a branch target address are held in a branch address register 30. In the embodiments of FIGS. 1 & 3 the setting signals for setting the branch point address and the branch target address are supplied through buses 206, 207. In FIG. 3, a branch point address/branch target address cancel signal also is provided on cancel signal bus 208. In FIG. 3, similarly to FIG. 1, when the branch target address is read out from the branch address register 30, the branch target address and the branch point address are erased from the branch address register 30. When a conditional cancel instruction is executed in the instruction executing section 23 and when the condition designated by the conditional cancel instruction (for example, flag A=1) holds, a cancel signal is output on cancel signal bus 208, and thereby the branch point address and branch target in the branch address register 30 are canceled. The operation and configurations of the comparator 11, the program counter 12, the incrementor 13 and the selector 14 are the same as in FIG. 1.

Figure 8:
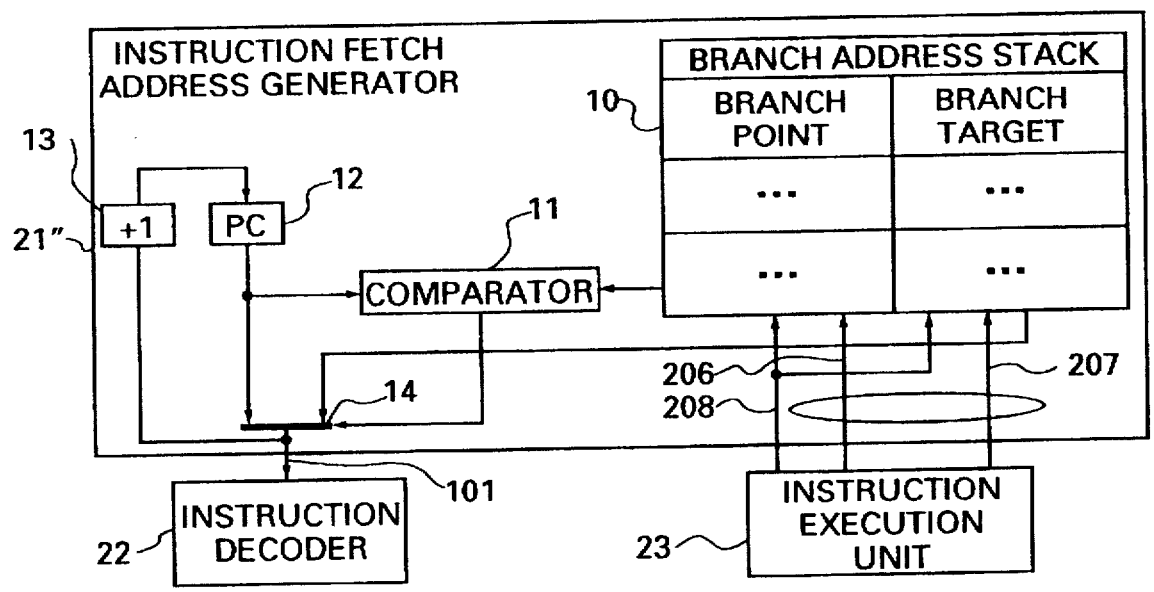
FIG. 8 is a diagram showing a third embodiment of the instruction fetch address generator.

FIG. 8 shows another embodiment of the instruction fetch address generator 21" which has the structure of FIG. 1 and additionally is provided with the cancel signal bus 208. The cancel signal provided on bus 208, as in the description of FIG. 3, cancels the address pair in the bottom row in the branch address stack 10, namely, the most recently reserved address pair as a modification. The instruction execution unit may designate which one of a plurality of address pairs in the branch address stack 10 should be canceled.

FIG. 4 shows examples of branch reservation instructions and cancel instructions to cancel the branch reservation, all of which may be used at different times in the same system.

Example (a) is a most basic form of a branch reservation instruction having a branch point address (from__addr) and a branch target address (to__addr) as two immediate operands to designate the respective address values in the instruction. Either or both of these two immediate operands may be relative or offset values with respect to the current value in the program counter. If address calculation using the relative values is required, it can be done in the instruction execution section 23 of FIG. 2, for example.

Example (b) depicts another form of the branch reservation instruction, which allows the branch target address to be designated by the content of a register, in contrast to example (a). When this instruction is executed, the branch target address is obtained by referring to the content of the register, then a pair of the branch point address designated by the instruction and the branch target address obtained above is set in the branch address stack 10 or branch address register 30. This instruction (b) is effective when the branch target is determined dynamically during execution of the instruction (for example, a return from a subroutine) and when a sufficiently large value cannot be set due to shortage of bit length necessary for instruction encoding (at the time of generation of machine language by the compiler) for the two immediate operands of Example (a).

Example (c) is an instruction to conditionally cancel a branch which has been reserved. By combining the instruction of Example (c) with the branch reservation instruction of Example (a) or (b), a conditional branch processing can be realized. When a plurality of branch reservations are stored concurrently in the stack 10 of a processor 1 as in the embodiments of FIG. 1 and FIG. 8, it is necessary to designate which branch reservation should be canceled. In this example, the most recent address pair of branch reservations is always canceled, as described with reference to FIG. 1 and FIG. 8. Therefore, in using Example (c) only the condition for cancellation is designated by "condition" in the instruction. When the condition (for example, flag A=1) is met, a cancel signal is fed to the branch address stack 10 and the most recent branch reservation address pair is canceled.

Example (d) shows a conditional cancel instruction wherein the contents of the designated two registers %a and %b are to be compared; and when the condition that has been designated by "condition" is satisfied, this instruction cancels the most recently reserved branch reservation in the same way as in Example (c). This instruction (d) is a combination of compare instruction which often appears in the conditional branch processing and a conditional cancel instruction which designates only the cancel condition as in Example (c). The number of instructions can be reduced since the combined instructions do not need to be executed separately. Further, in the Example (d), the number of operands that must be designated is only 3 (two registers as objects of comparison, and a condition for branch cancellation). Due to such simplicity, there is no difficulty in instruction encoding.

When a condition so complicated that some difficulty in a compare and cancel instruction encoding is anticipated is, a branch cancel instruction such as Example (c), which designates only a condition, is combined with an ordinary comparison instruction or the like.

The branching according to the present invention will now be compared with the conventional branching, in FIGS. 5A–5C. FIG. 5A is a conditional processing written in the C language. When the designated condition (a==b) is satisfied, the "then" clause is executed, and when it is not, the "else" clause is executed.

FIG. 5B is a conditional branch processing of the processing shown in FIG. 5A for a conventional processor with instruction sequences. It is assumed that the values of variables a and b are held in registers %a and %b, respectively. The comparison instruction "compare %a, %b" checks whether the values of variables a and b are equal to each other. If the values of variables a and b are not equal, a branch takes place to label L1 to execute the "else" clause in accordance with the conditional branch instruction "branch not_equal, L1". If the values of variables a and b are equal, the branch to label L1 does not take place, instead, label L0 for processing of the "then" clause is executed. At the end of the "then" clause, a branch to label L2 takes place in accordance with the unconditional branch instruction "branch L2", without processing the "else" clause of label L1.

In contrast to the example of FIG. 5B, an instruction sequence according to the present invention is shown in the example of FIG. 5C, where a branch to the "else" clause in label L1 is to be executed if the condition is not satisfied, and it is reserved by the instruction "branch_target L0, L1". It is assumed that the values of the variables a and b are held in the registers %a and %b, respectively as well as FIG. 5B. Thereby, in accordance with a conditional cancel with comparison "compare_and_pop %a, %b, equal", the values of variables a and b are compared. Then, only when the condition that the values of variables a and b are equal is satisfied, the reservation of a branch to "else" clause is canceled. In order to complete this branch reservation cancellation before the instruction fetch at branch point L0, optimization of scheduling of the instruction sequence is made by the compiler. If the optimization is not made, the reservation cancellation by the conditional cancel instruction is executed immediately before the execution of the instruction at the branch point, and thereby the cancellation is not completed before the instruction fetch. It is then necessary to cancel the instruction which has been fetched in accordance with the reservation.

A large difference from the example of FIG. 5B, is that in the example of FIG. 5C all instructions until the branch point L0 are related to reservation, any other instruction do not need to be placed at (or immediately before) the branch point L0, and consequently it is possible to easily perform a scheduling of instructions including those placed before and far from the branch point L0. That is, there is a high degree of freedom for optimizing the instruction scheduling in the compiler.

In the example of FIG. 5C, when a branch reservation is canceled in accordance with a conditional cancel instruction, the "then" clause of label L0 is executed. At the beginning of the "then" clause, a branch from L1, which is at the end of the "then" clause and immediately before the "else" clause is reserved by the instruction "branch_target L1, L2", so that the next processing of label L2 can be continued without delay after completion of the processing of the "then" clause, without processing the "else" clause of label L1. There is no need to place any other instruction at label L1 or immediately before L1, and thereby there is a high degree of freedom available in instruction scheduling.

FIG. 6 is an example of an instruction sequence for executing a subroutine call/return in the processor which executes a branch reservation. In a subroutine call, the subroutine entry address can be determined statically in most cases, and thereby the branch reservation of the present invention is applied easily. In a subroutine return, the return address is generally determined dynamically at the time when the subroutine is called, and thereby the return address is determined sufficiently in advance of the end of the subroutine at which an actual branch point occurs. Because of the above, the branch reservation according to the invention can be applied to the subroutine call and return to improve overall efficiency.

In FIG. 6, a call for subroutine L2 is reserved by instruction "branch_target L1, L2" sufficiently in advance of call point L1. In order to set a subroutine return address from the subroutine, return address L1 (which is the call point in the example of FIG. 6) is set in a register %r1 by an instruction "mov L1, %r1" before the call point L1. The subroutine L2 on the called side reserves a return address by a branch reserve instruction "branch_on_register L3, %r1", which content of register %r1 is made its return address, before the end of the subroutine L3. With the instruction sequence described above, an operation a subroutine L2 is called at call point L1, and the processing returns from the end L3 of the subroutine to the return point L1.

FIGS. 7A and 7B show a comparison of the pipeline parallel operations in example of FIG. 7B where branch is taken in a processor which performs branch reservation according to the invention as described with reference to FIGS. 1, 3, or 8, with the pipeline operation in example of FIG. 7A of branch in a conventional processor. Here, and elsewhere in the figures, such as FIGS. 9A–9C and 12A–12C: F represents instruction fetch; D represents instruction decode; E represents instruction execution; M represents memory access; W represents register writeback; and the arrows represent the timing of the supply of the branch target address. Each block represents an instruction, and each line is shifted by one block indicating an on cycle difference in initiating the instruction fetch in accordance with the incrementing of the PC.

In the conventional example of FIG. 7A, the branch target cannot be determined until at least the branch instruction is fetched and the branch instruction decode cycle (D) is reached; thereby, there are two cycles of the branch instruction and the delay slot therefor between the instruction immediately before the branch instruction and the branch target instruction. In the example of FIG. 7B, no instruction for branch operation is required at the branch point. When it is detected in fetch cycle (F) of a branch point instruction (or an instruction immediately before the branch point if the compiler deleted the branch point instruction) that instruction fetch has reached the branch point, a branch target instruction fetch is started promptly through the mechanisms as described with reference to FIGS. 1, 3 and 8. Extra cycles are not needed as in the example of FIG. 7A. The efficiency of the overall pipeline operation is improved substantially by the present invention.

Figure 9A:
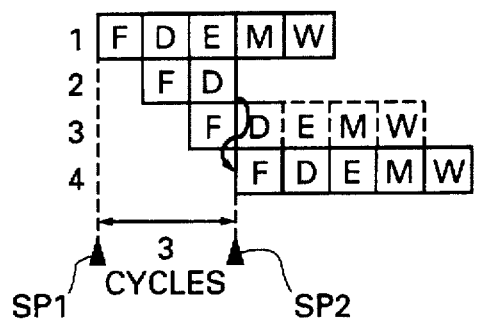
FIG. 9A is an example of a pipeline operation showing a branch prediction miss in a conventional branch processing.
Figure 9B:
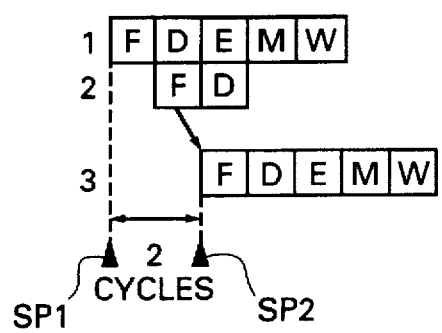
FIG. 9B is an example of a pipeline operation showing a correct branch prediction in a conventional branch processing.
Figure 9C:
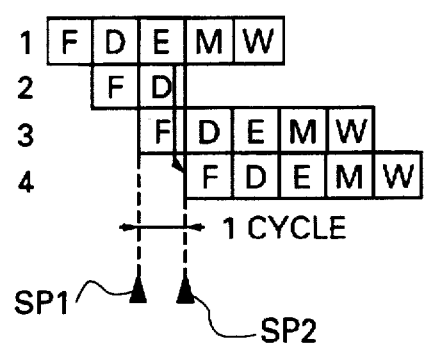
FIG. 9C is an example of a pipeline operation for a branch reservation performed according to the present invention.

FIGS. 9A–9C show the difference between conventional branch prediction methods and the branch reservation method of presented invention. In each of FIGS. 9A–9C, the start point of the instruction fetch at the branch point is indicated by SP1 and the start point of the instruction fetch at the branch target is indicated by SP2.

FIG. 9A describes an example of a pipeline operation in the case of branch prediction miss in a conventional branch prediction method. Instruction 1 in FIG. 9A is an instruction just before the branch. Instruction 2 is a branch instruction, and instruction 3 is an instruction subsequent to the branch that is canceled because of the branch. Instruction 4 is an instruction at the branch target. Branch prediction miss is detected no sooner than the decoding (at the D stage) of the branch instruction 2. However, when the branch prediction miss is detected, the instruction subsequent to the branch instruction 3 has already been fetched. So, it is necessary to cancel the decoding and the following operation of that instruction (3). At the same time, instructions must be fetched again from the correct branch target address (instruction 4). The correct branch target address is also generated no sooner than the decoding of the branch instruction. As a result, it takes 3 cycles counting from the point of fetch of the instruction at the branch point (just before the branch instruction 1).

Conventionally, instruction fetch of a branch instruction and its branch target address are predicted with some predetermined algorithm to reduce the penalty of branch operation. FIG. 9B shows an example of pipeline operation when correct branch prediction is made for both the branch instruction fetch and the branch target address. Here, instruction 1 is an instruction just before the branch, instruction 2 is a branch instruction, and instruction 3 is an instruction at the branch target. Note that, this is only an example for the case wherein the branch instruction has been executed at least once in the past and, in addition, the used branch prediction algorithm matches the character of the branch instruction well.

In the FIG. 9B, it is predicted that there exists a branch instruction at the current fetch address when the branch instruction is fetched (instruction 2, F stage). At the same time, its branch target address is also predicted. So at the next instruction (3), the fetch address is switched to the predicted branch target address. As a result, if this prediction is correct, it enables the instruction at branch target address to be executed without delay. It takes 2 cycles to start the instruction fetch at the branch target address, counting from the fetch of the instruction (1) just before the branch instruction (2) (at the branch point).

Whereas FIGS. 9A and 9B describe the pipeline operation of conventional branch prediction methods, FIG. 9C shows the pipeline operation of one embodiment of the present invention. In FIG. 9C, instruction (1) is the branch reservation instruction, instruction 2 is the ordinary instruction, which can be any useful operation, instruction 3 is the instruction at the branch point, and instruction 4 is the instruction at the branch target. Both the branch point address and the branch target address have been reserved at the execution (E stage) of the branch reservation instruction (1) long before the instruction fetch reaches the branch point. The location of the branch reservation instruction is determined by the compiler at the time of the program code generation. After reservation is made, one or several ordinary instructions (2) are fetched and executed. Then when it is detected that the instruction fetch address has reached the reserved branch point (instruction 3), the instruction fetch address is immediately switched to the reserved branch target at instruction 4. Note that there is no need to execute instructions related to the branch operation at this point. Consequently, it takes only one cycle to start the instruction fetch at the branch target, counting from the fetch of the instruction (2) at the branch point 2.

FIGS. 10A–10D show the compiling and generating of program code that enables the branch reservation instruction to be inserted and the pipeline operation to be performed during the running of the program code, according to the present invention.

Figure 10A:
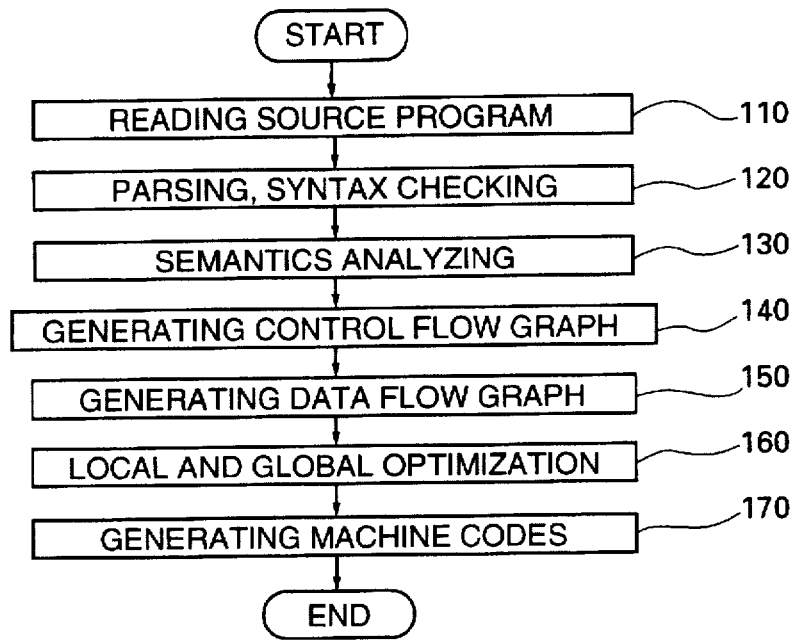
FIGS. 10A and 10B are flow charts showing the compiling of a program to insert the branch reservation instruction according to the present invention.

FIG. 10A is a flow chart showing the compiling of a program to generate the program code during which the branch reservation instruction according to the present invention is inserted. In particular, FIG. 10A shows that a source program is read in step 110, and in step 120 parsing and syntax checking are performed. In step 130, the semantics are analyzed and in step 140 the control flow graph is generated. The data flow graph is generated thereafter in step 150 and in step 160 local and global optimization is performed. In step 170 the machine codes are generated for the program code.

Figure 10B:
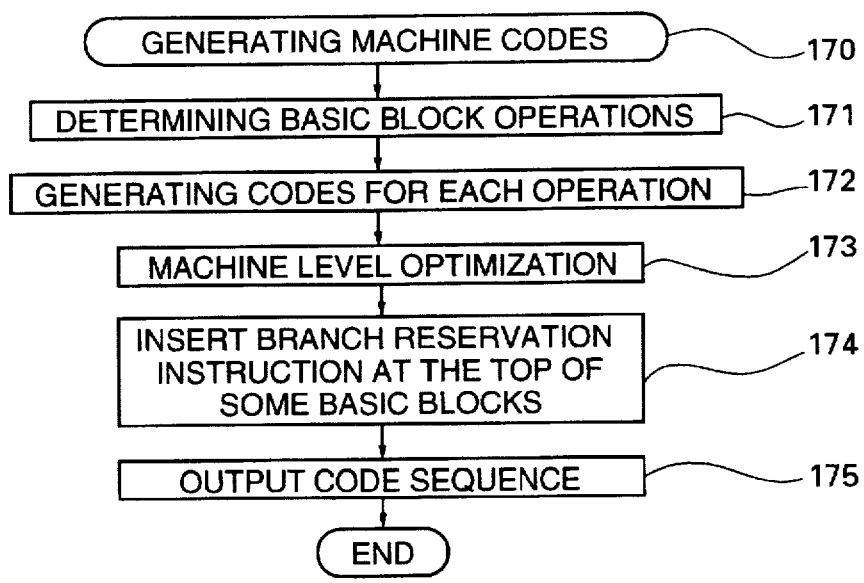

In FIG. 10B, the flow chart shows the generating of the machine codes step 170, which includes determining basic block operations in step 171 and generating codes reach operation in step 172. In step 173, machine level optimization is performed and in step 174, the branch reservation instruction is inserted at the top of some of the basis blocks. Finally, the program code sequence is output in step 175.

Figure 10C:
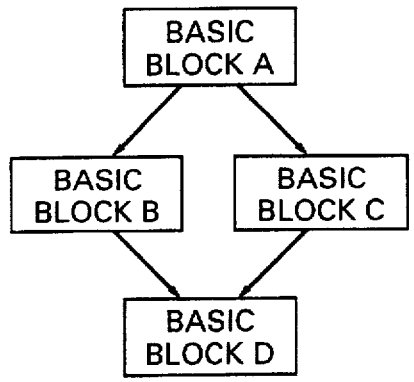
FIGS. 10C and 10D are diagrams showing the basic blocks of a computer program having the branch reservation instruction according to the present invention.
Figure 10D:
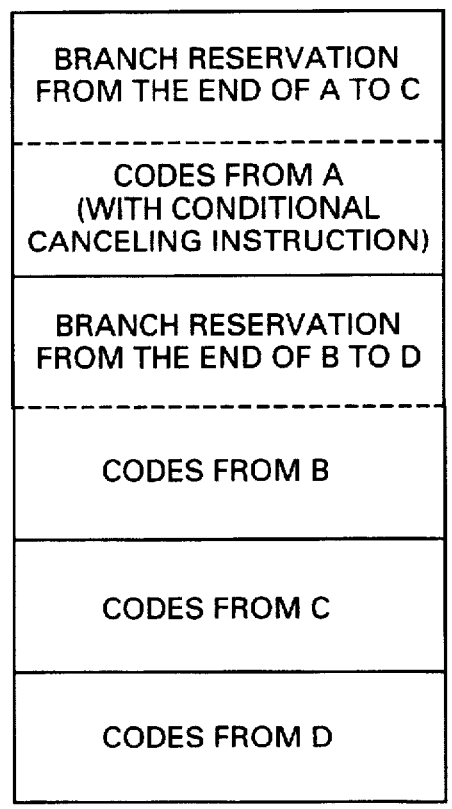

In FIG. 10C, and FIG. 10D, four basic blocks A–D are shown. The flow of FIG. 10C shows the conditional branching from basic block A to one of basic blocks B and C. This is also shown in FIG. 10D, wherein the branch reservation is inserted at the top of basic block A, and also in block A, a conditional canceling instruction is provided in the compiling. Thus, the program can proceed from basic block A to either one of basic blocks B or C depending upon whether or not the condition designated by the conditional canceling instruction holds. Similarly, basic block B includes a branch reservation instruction, as shown in FIG. 10D, wherein the branch sends the flow to basic block D, as shown in FIG. 10C.

Figure 11A:
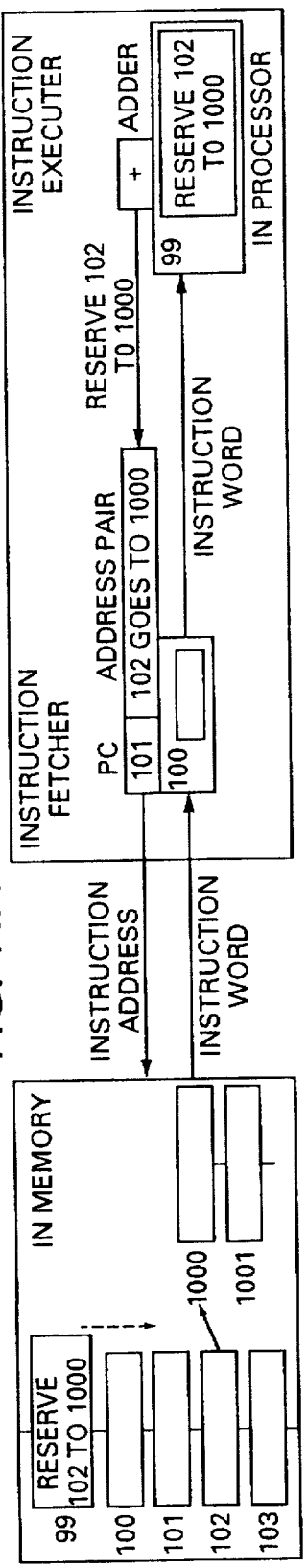
Figure 11B:
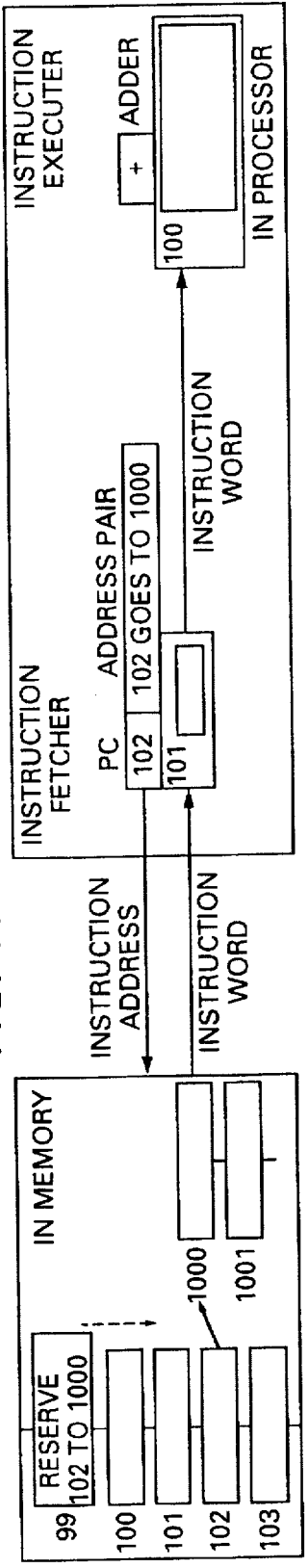
Figure 11C:
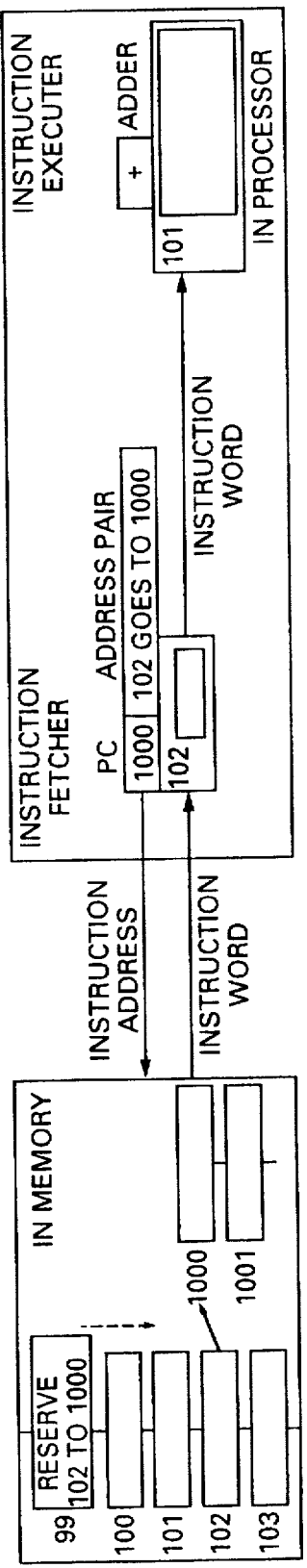

FIGS. 11A–11E show an example of the program code that is generated with a branch reservation instruction included. In particular, in the compiling of the program code, a branch point instruction was detected at machine instruction statement 102, having a branch point target address of 1000. Accordingly, the branch reservation instruction was inserted in the program at machine instruction statement 99, wherein the box next to the statement number (instruction address) indicates the contents of the statement, which includes the instruction "reserve 102 to 1000". During execution of the program, the PC is incremented. At PC=99, the branch reservation instruction is fetched. This is shown to have been completed in FIG. 11A. As shown in FIG. 11B, the PC has been incremented to 102 and the ordinary instruction 100 has been executed in the processor. In FIG. 11B, the PC has been incremented to 102, and the comparison with the branch address stack or branch address register has determined that the branch point has been reached and the branch target address is retrieved from the branch address stack. Accordingly, the PC is changed to 1000 in FIG. 11C and incremented to 1001 in FIG. 11D and to 1002 in FIG. 11E. Accordingly, the program successfully is branched without instructions required to be executed at the branch point.

Figure 12A:
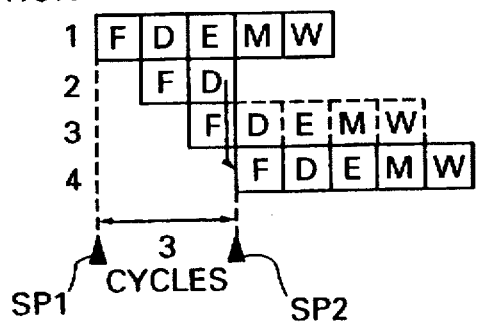
FIG. 12A is a diagram showing a conditional branch point instruction executed in accordance with a cancellation instruction for a mispredicted case.
Figure 12B:
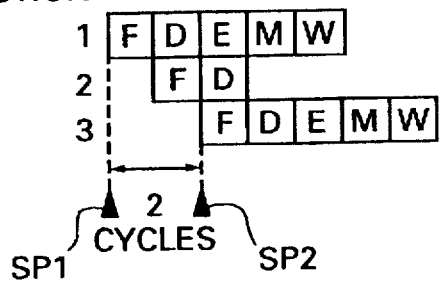
FIG. 12B is a diagram showing a correctly predicted case.
Figure 12C:
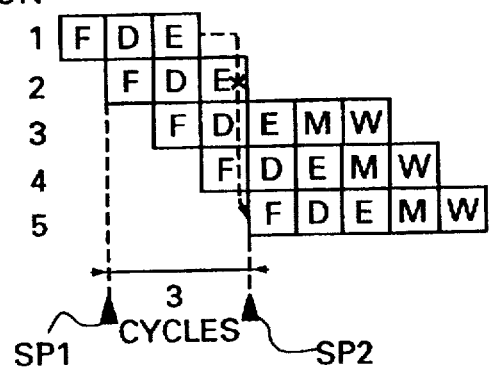
FIG. 12C is a conditional branch point instruction executed in accordance with a cancellation instruction according to the present invention.

FIGS. 12A–12C show the difference between the pipeline operation of conventional branch prediction methods for conditional branch and that of the canceling reservation method of the present invention. In FIG. 12A, the mispredicted case is shown, wherein instruction 1 is the compare instruction, instruction 2 is the branch instruction, instruction 3 is the mispredicted instruction (canceled) wherein the incorrect prediction has been performed, and instruction 4 is the instruction following the branch. In FIGS. 12A–12C, the start point of the instruction fetch of the cancel or compare instruction is SP1 and the start point of the instruction fetch after the branch is SP2.

As shown in FIG. 12A, the mispredicted case requires three cycles counting from the point of instruction fetch of the cancel or compare instruction prior to the branch instruction. On the other hand, in FIG. 12B, the correctly predicted case can be performed in two cycles, but the correct prediction cannot be made the first time the branch point is reached in the program code since the prediction is required to be made on the basis of initial execution of the code at the branch point.

In FIG. 12C, the present invention includes a branch reservation instruction (1), a conditional canceling instruction (2), an ordinary instruction (3), an instruction at the branch point (4) and an instruction following the branch point (5). In FIG. 12C, the arrow with the dashed line indicates the branch target propagation that is used unless the branch instruction is canceled by the conditional canceling instruction 2. Also, the ordinary instruction 3 is included for timing, but may be any useful instruction.

FIG. 12C is executed with the same timing as the machine instruction statements 99–103 shown in FIGS. 11A–11E. For example, at statement 99 the branch reservation instruction 1 can be received by the instruction executor and the branch point address and branch target address stored as a pair in the address pair storage device, such as a stack or register, and at an instruction 100 (instruction 2 in FIG. 12C), the conditional canceling instruction can be executed. FIG. 12C shows a "X" indicating that the propagation arrow supplying the branch target address can be canceled in the execution of statement 100. The ordinary instruction in statement 101 (instruction 3 in FIG. 12C) and the instruction 4 at the branch point (statement 102) would be executed in the same manner as already described with reference to FIGS. 11A–11C. The difference, however, is that if the branch point instruction is canceled by statement 100, then the next instruction were to be fetched after 102 would be 103 in FIG. 11D, not 1000, which is shown. According to this embodiment of the invention, a conditional branching can be inserted in a program code and performed without the requirement of prediction as in the conventional methods. Further, the conditional branch can be performed in three cycles starting at SP1, which is the start point of the instruction fetch of the cancel or compare instruction (2).

Various other modifications to the preferred embodiments will be evident to the person of ordinary skill in the art. All such modifications that basically rely upon the teachings through which the present invention has advanced the state of the art are properly considered within the spirit and scope of the invention.

We claim:

1. An instruction branching method performed by a processor during execution of a program, comprising the steps of:

setting in memory an address of a branch point and an address of a branch target designated by a first instruction that is executed before an instruction fetching address reaches said address of said branch point;

judging whether or not an instruction fetch address has reached said address of said branch point by comparing the instruction fetching address with said address of said branch point set in said memory; and when said instruction fetch address is judged to have reached said address of said branch point, switching said instruction fetch address to said address of said branch target.

2. The instruction branching method according to claim 1, wherein when a plurality of said first instructions are executed in order, repeating said step of setting an address of the branch point and an address of the branch target a corresponding plurality of times, and in said step of judging, a branch point address which has been set latest is selected for said comparing from among the plurality of branch point addresses.

3. An instruction branching method according to claim 1, wherein after said step of executing said first instruction and before the instruction fetch address reaches said address of said branch point, said instruction branching method further comprises a step of executing an instruction to cancel said address of said branch point and said address of the branch target in said memory.

4. An instruction branching method according to claim 2, wherein after said step of executing said first instruction and before the instruction fetch address reaches said address of said branch point, said instruction branching method further comprises a step of executing an instruction to cancel one of said address of said branch point and said address of said branch target in said memory.

5. An instruction branching method including the method steps of claim 1, and further including the following steps performed by a processor during compiling of the program:

generating a branch reservation instruction as said first instruction that includes said branch point address and said branch target address; and inserting the branch reservation instruction in a sequence of instructions before the branch point.

6. The method of claim 5, wherein said compiling steps of generating and inserting are in response to and in conformance with reaching a branch in the program being compiled.

7. The method of claim 5, wherein said step of inserting inserts the branch reservation instruction at least a sufficient number of instructions prior to the branch point to complete said step of setting prior to said instruction fetch address reaching said branch point to prevent delay.

8. An instruction branching method according to claim 1, performed by a pipeline processor for parallel processing, further comprising the steps of:

fetching an instruction that is subsequent to said first instruction and in parallel with said setting.

9. The method of claim 8, decoding a previously fetched instruction that is subsequent to said first instruction and prior to said instruction of said fetching. in parallel with said fetching and said setting.

10. The method of claim 2, wherein said step of setting an address of the branch point and an address of the branch target stores said address of the branch point and an address of the branch target in a stack memory.

11. An instruction branching method according to claim 1, including the steps of executing a call to a subroutine and in response thereto generating a return address and executing the first instruction to reserve said return address from said subroutine.

12. In a processor having an instruction fetch address generator, an instruction decoder, and an instruction execution section, all operating in parallel through interconnecting buses and memory storing instructions, wherein the improvement comprises:

a program counter for holding an instruction fetch address with which an instruction is fetched from said memory;

branch address pair storage that stores a pair of a branch point address and a branch target address set upon execution of one of said instructions before the program counter reaches said branch point address;

a comparator for comparing a value held in said program counter with the branch point address stored in said branch address pair storage; and a selector for switching, when the result of said comparing shows coincidence, said value held in said program counter to the branch target address stored in said branch address pair storage, so that when said instruction fetch address coincides with said branch point address, execution branches to the branch target address.

13. The processor according to claim 12, wherein said branch address pair storage stores a plurality of different pairs of a branch point address and a branch target address, and said comparator compares the most recent pair from said plurality of different pairs stored in said branch address pair storage with said value held in said program counter.

14. The processor according to claim 13, further including means for canceling, in response to a cancel signal from said instruction executing section, a pair of branch point address and branch target address that said cancel signal designates.

15. The processor according to claim 12, further including means for canceling, in response to a cancel signal from said instruction executing section, a pair of branch point address and branch target address that said cancel signal designates.

* * * * *